United States Patent
Ting et al.

(10) Patent No.: US 7,151,925 B2
(45) Date of Patent: Dec. 19, 2006

(54) SOFTWARE DEFINED RADIO (SDR) ARCHITECTURE FOR WIRELESS DIGITAL COMMUNICATION SYSTEMS

(75) Inventors: Pangan Ting, Feng-Yuan (TW); Hui-Ming Wang, Taipei (TW); Nan-Sheng Huang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 375 days.

(21) Appl. No.: 10/073,933

(22) Filed: Feb. 14, 2002

(65) Prior Publication Data

US 2003/0050055 A1    Mar. 13, 2003

Related U.S. Application Data

(60) Provisional application No. 60/317,976, filed on Sep. 10, 2001.

(51) Int. Cl.
*H04M 3/00*    (2006.01)
(52) U.S. Cl. .............. 455/418; 455/419; 455/420; 713/1; 713/100
(58) Field of Classification Search .............. 455/419, 455/550, 575.1, 575.2, 575.3, 557, 542, 323, 455/509, 418; 375/219, 220, 222, 316; 370/329, 370/93.02; 713/100, 1; 717/100, 101, 106, 717/140, 168, 169, 170, 171, 172, 173
See application file for complete search history.

(56) References Cited

U.S. PATENT DOCUMENTS

| | | | | |
|---|---|---|---|---|
| 6,052,600 | A * | 4/2000 | Fette et al. .............. | 455/509 |
| 6,349,204 | B1 * | 2/2002 | Goetz et al. ............ | 455/419 |
| 6,415,384 | B1 * | 7/2002 | Dave ....................... | 713/100 |
| 6,721,581 | B1 * | 4/2004 | Subramanian .......... | 455/575.1 |
| 6,738,967 | B1 * | 5/2004 | Radigan .................. | 717/146 |
| 6,928,637 | B1 * | 8/2005 | Leherbauer ............. | 717/122 |
| 2002/0095652 | A1 * | 7/2002 | Iwata ....................... | 717/104 |
| 2003/0167401 | A1 * | 9/2003 | Murren et al. .......... | 713/200 |
| 2003/0181218 | A1 * | 9/2003 | Mukai et al. ........... | 455/550.1 |

FOREIGN PATENT DOCUMENTS

WO    WO00/69084    11/2000

* cited by examiner

*Primary Examiner*—Joseph Field
*Assistant Examiner*—Julio Perez
(74) *Attorney, Agent, or Firm*—Akin Gump Strauss Hauer & Feld, LLP

(57) ABSTRACT

A system and method for providing one hardware platform to implement multiple wireless communication standards, services and applications. The kernel oriented macro based software defined radio (SDR) architecture provides a configurable and programmable hardware platform to implement multiple wireless communication standards, services and applications.

2 Claims, 13 Drawing Sheets

SOFTWARE DEFINED RADIO (SDR) ARCHITECTURE FOR WIRELESS DIGITAL COMMUNICATION SYSTEMS

REFERENCE TO RELATED APPLICATIONS

The present application claims priority from U.S. Provisional Application No. 60/317,976 filed Sep. 10, 2001.

BACKGROUND OF THE INVENTION

A. Field of the Invention

The present invention relates to the field of wireless digital communication and, more particularly, to a software defined radio system that uses a multi-layered architecture to implement multiple standards, services and applications.

B. Description of the Prior Art

In general, frequency bandwidth is an expensive resource and many countries view it as common property. Because the usages of released frequency bands for different services in different regions are different, it is difficult to reuse the same equipment to communicate with equipment in other regions. Typically, wireless digital communication standards are implemented on different hardware platforms. For example, except for a dual-mode Global System for Mobile Communications (GSM) handset, a 900 MHz GSM handset can not be used in the region of 1800 MHz GSM. It is inefficient for users to travel among different regions when they can not enjoy the different services provided by different vendors serving those regions. As a result, users may have to carry several different purpose handsets to enable communication as they travel from one region to another.

FIG. 1 illustrates a wireless digital communication system 100 that embodies a conventional approach to implement a single communication standard. Signals are received by an antenna 102 and initially processed by a radio frequency (RF) subsystem 104 and an intermediate frequency (IF) subsystem 106. RF subsystem 104 and IF subsystem 106 implement waveform processing of analog signals, including analog signal mixing, filtering, amplifying, and gain control. The analog signals processed by RF subsystem 104 and IF subsystem 106 are then fed into an analog-to-digital converter (A/D) subsystem 108 for conversion into an equivalent digital signal representation.

In general, the digital signals output by A/D subsystem 108 are processed by a dedicated logic device 110 for fixed standard-specific and channel-specific functions such as modem, digital filtering and other dedicated signal processing. The output from the dedicated logic device 110 is placed on a bus 112. Signals from bus 112 are routed to a programmable logic device 114, digital signal processor (DSP) 116, and a microprocessor 118. By controlling the download of functionality into programmable logic device 114 and managing the data flow input and output of programmable logic device 114 new specific functions can be performed.

For lower processing rate applications, DSP 116 can be used to implement the functions of digital signaling processing. For higher processing rate applications, the programmable logic device 114 can be used to provide a hardwired solution to implement high bandwidth functions of digital signaling processing. Microprocessor 118 is a general-purpose microprocessor and is used to implement control functions. A software part 120 of FIG. 1 shows a control architecture of a conventional single-standard communication device. An operating system (OS) 122 plays the role of process management, and in general runs on microprocessor 118. An application 124 which executes a set of hardware/software functions is run under OS 122. If application 124 needs computational resources, at least one of programmable logic device 114, DSP 116, and microprocessor 118 is used to perform signal processing and create a data flow and control flow. By combining these resources, the application can run on the hardware platform and achieve a required performance.

FIG. 2 illustrates a wireless digital communication system 200 that is implemented in accordance with a conventional approach for implementing multiple communication standards. System 200 is configured similarly to system 100 except that it includes a dedicated logic device bank 202 to support different standard-specific, channel-specific, modem-specific and other signal processing functions. Signals are received by antenna 102 and initially processed by RF subsystem 104, IF subsystem 106, and A/D subsystem 108 for conversion to an equivalent digital signal representation. Logic device bank 202 receives the digital signals output by A/D subsystem 108. The output from logic device bank 202 is placed on bus 112 and routed to programmable logic device 114, DSP 116, or microprocessor 118. Typically dedicated logic device bank 202 is optimized to suit different wireless digital communication standards. Therefore, the conventional approach depicted in FIG. 2 to accommodate multiple standards has essentially combined disparate hardware and software resources separately optimized for each standard of interest. This platform results in poor efficiency in terms of size, cost and power consumption.

FIG. 3 illustrates a control architecture 300 for a conventional multiple standard communication equipment. OS 122 plays the role of process management, and in general runs on microprocessor 118. Thus each application 124 which executes a set of hardware/software functions is running under OS 122. The resource requirements for different standards, applications, and services are different. Since each application needs computational resources, either programmable logic device 114, DSP 116, or microprocessor 118 is provided to take care of signal processing and to create a data flow and control flow. Different products and services decide the required resources and combine them. After suitable combination, each application can run on the hardware platform and achieve the required performance. This architecture results in poor efficiency in terms of size, cost and power consumption.

FIG. 4 illustrates a relationship between efficiency and flexibility for different hardware devices. From the viewpoint of efficiency, a fixed-hardware resource such as an application-specific integrated circuit (ASIC) is highly efficient due to its design for a dedicated function. In general, highly configurable and programmable logic devices such as a microprocessor or a digital signal processor are inefficient with respect to both power and size. By analyzing the energy efficiency via MOPS/mW (million operations per milliWatt) among several computational units, there is an efficiency gap between the ASIC and the DSP.

FIG. 5 illustrates a wireless digital communication device 500, which comprises a digital down-converter (DDC) 518, a digital up-converter (DUC) 519, a software-programmable digital signal processor 502, a software-programmable microprocessor 504, a heterogeneous re-configurable multiprocessing logic circuit 506, and a bus 508 connecting digital signal processor 502, microprocessor 504, and multiprocessing logic circuit 506. Logic circuit 506 comprises a set of heterogeneous signal processing kernels 510, 512, and 514, and a re-configurable data router (not shown) interconnecting the heterogeneous signal processing kernels. The signal processing kernels and data routers are controlled by microprocessor 504 via control busses (not shown).

The platform embodied in device 500 enables the same hardware resources to be re-configured to provide more flexible delivery of arithmetic and control operations by usage of multiprocessing logic circuit 506. This device is constructed in accordance with a set of software modules each combined with hardware. Software kernels 510 are executable on multiprocessing logic circuit 506, software kernels 512 are executable on software-programmable digital signal processors 502, and software kernels 514 are executable on microprocessor 504. Executive code 516 further facilitates the management of the data flow input and output of logic circuit 506 and controls the data flow and control flow of all computational resources.

Device 500 is configured to support an efficient fixed-hardware resource such as an ASIC and maintain flexibility so it can be re-configured into different hardware. Logic circuit 506 may improve a trade-off between efficiency and flexibility for the purpose of multiple standards, applications and services. However, in this architecture, the local characteristic of the data router and memory built on logic circuit 506 and the bus scheme constrains upgrade and extension.

SUMMARY OF THE INVENTION

The present invention is directed to architectures, devices, and methods that overcome the aforementioned problems and disadvantages formed in the conventional art.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

In accordance with the present invention there is provided an upgradeable and extendable wireless communication system, comprising: a plurality of layers, each layer including: a plurality of configurable computational units capable of implementing operation of wireless digital communication functions; a plurality of data flow components for forming a paths and having means for storing data between ones of said computational units; and a plurality of control flow components for forming a signaling-exchange network between ones of said computational units.

In accordance with the present invention there is provided a method of programming and configuring the components of an upgradeable and extendable wireless communication system in order to implement multiple wireless communication standards, services, and applications, comprising: identifying one of the application, standard or service to be implemented; compiling software associated with the identified application, standard or service; determining the utilization of hardware resources; and configuring hardware resources to meet the application, standard or service required.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

BRIEF DESCRIPTION OF THE DRAWINGS

For a better understanding of the invention, reference should be made to the following detailed description taken in conjunction with the accompanying drawings, in which.

DESCRIPTION OF EMBODIMENTS

Reference will now be made in detail to the embodiments of the invention, Wherever possible, the same reference numbers will be used throughout the drawings to refer to the same or like parts.

In accordance with the principles of the present invention, as embodied and broadly described herein, there is provided a kernel-oriented macro-based (SDR) multi-layered architecture for wireless digital communication systems capable of re-configuring and re-programming its components to implement multiple wireless communication standards, services and applications.

Embodiments consistent with the principles of the present invention include reprogramming and reconfiguring components to implement multiple wireless communication standards, services and applications. A kernel-oriented macro-based software defined radio SDR architecture is provided to improve the trade-off between efficiency and flexibility while accommodating multiple standards, applications, and services. In order to provide flexibility in SDR platform over the applications of a base-station, a Field Programmable Gate Array (FPGA) is used to supply enough flexibility to re-configure hardware for a usage of interest. Moreover, in order to increase efficiency of the FPGA, architecture consistent with the principles of the present invention uses optimized macros provided by FPGA vendors to improve the utility of the FPGA. Additional glue logic coupled with optimized macros are provided to build up data paths to support different standards, applications and services.

Architecture and methods consistent with the principles of the present invention support a layer-memory structure, a layer-router structure, and a layer-bus structure to construct an interconnection network to satisfy one characteristic of wireless digital communication systems, the locality between computational resources. Meanwhile, a hierarchical interconnection network supports increased utilization of the communication channel among computational resources. A kernel-oriented macro-based SDR multi-layered architecture consistent with the present invention also includes a performance feedback-decision resource management mechanism to adjust system performance toward a goal of incremental optimization.

Figure 1:
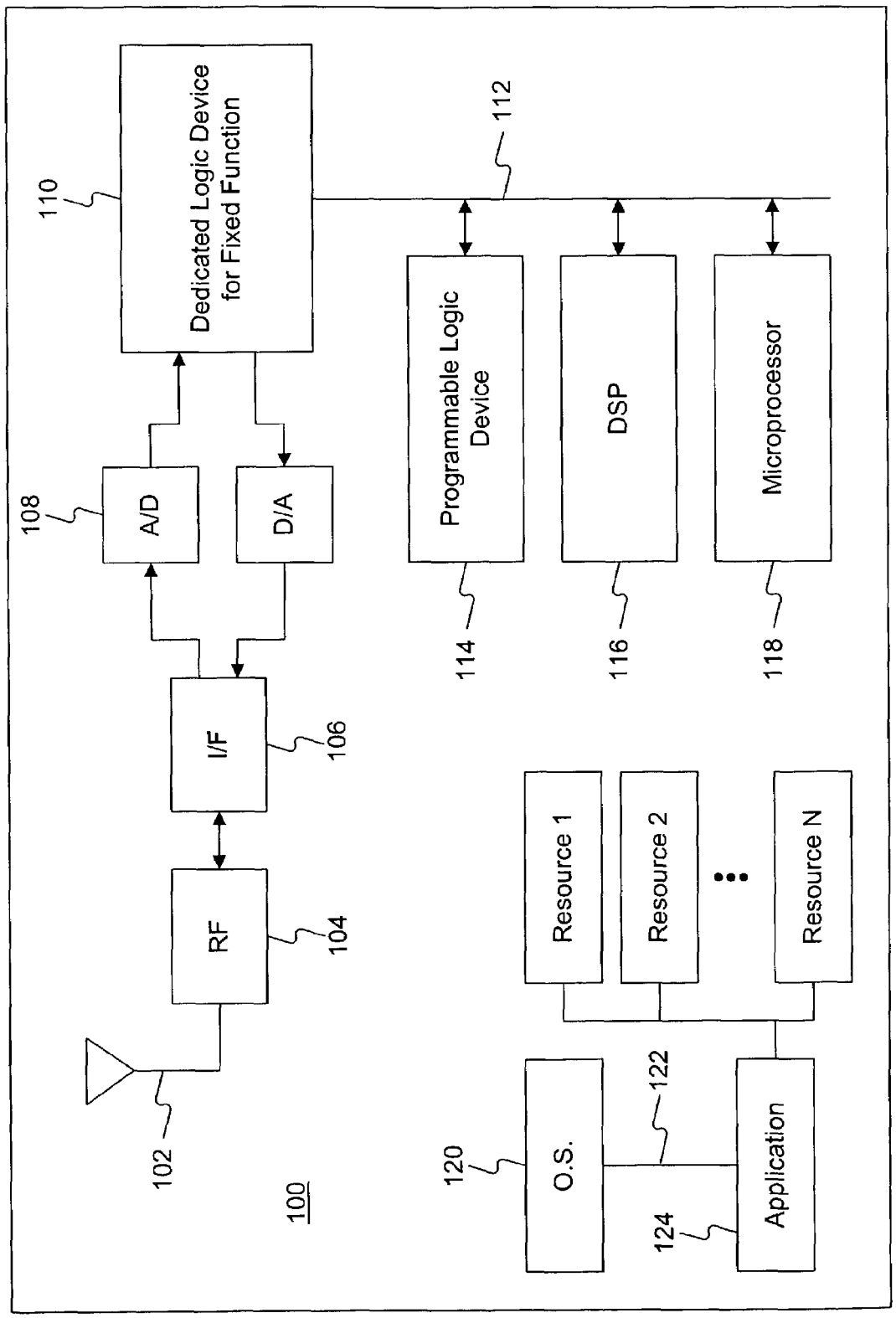
FIG. 1 illustrates a conventional wireless digital communication system.
Figure 2:
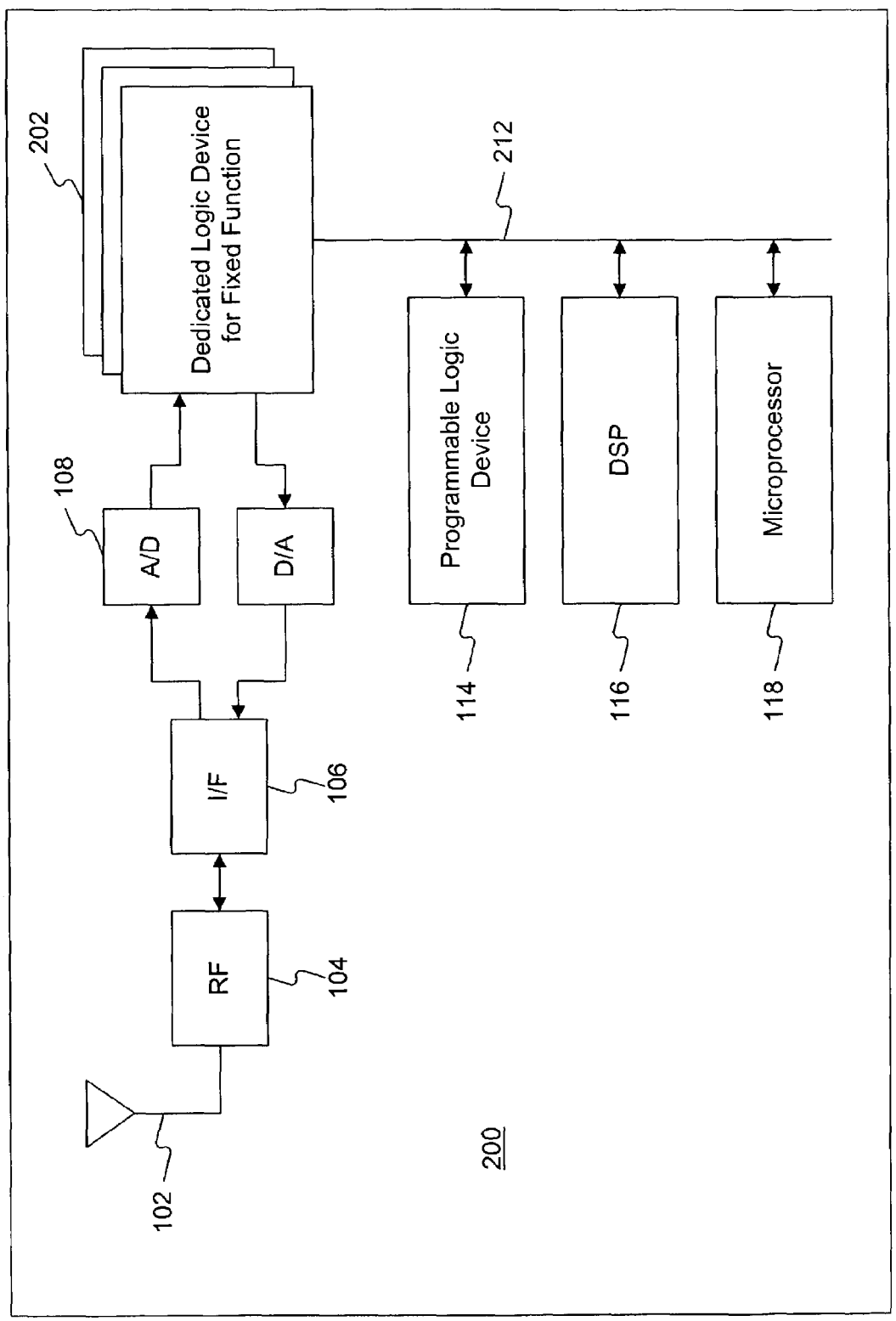
FIG. 2 illustrates a conventional multi-mode wireless digital communication system.
Figure 3:
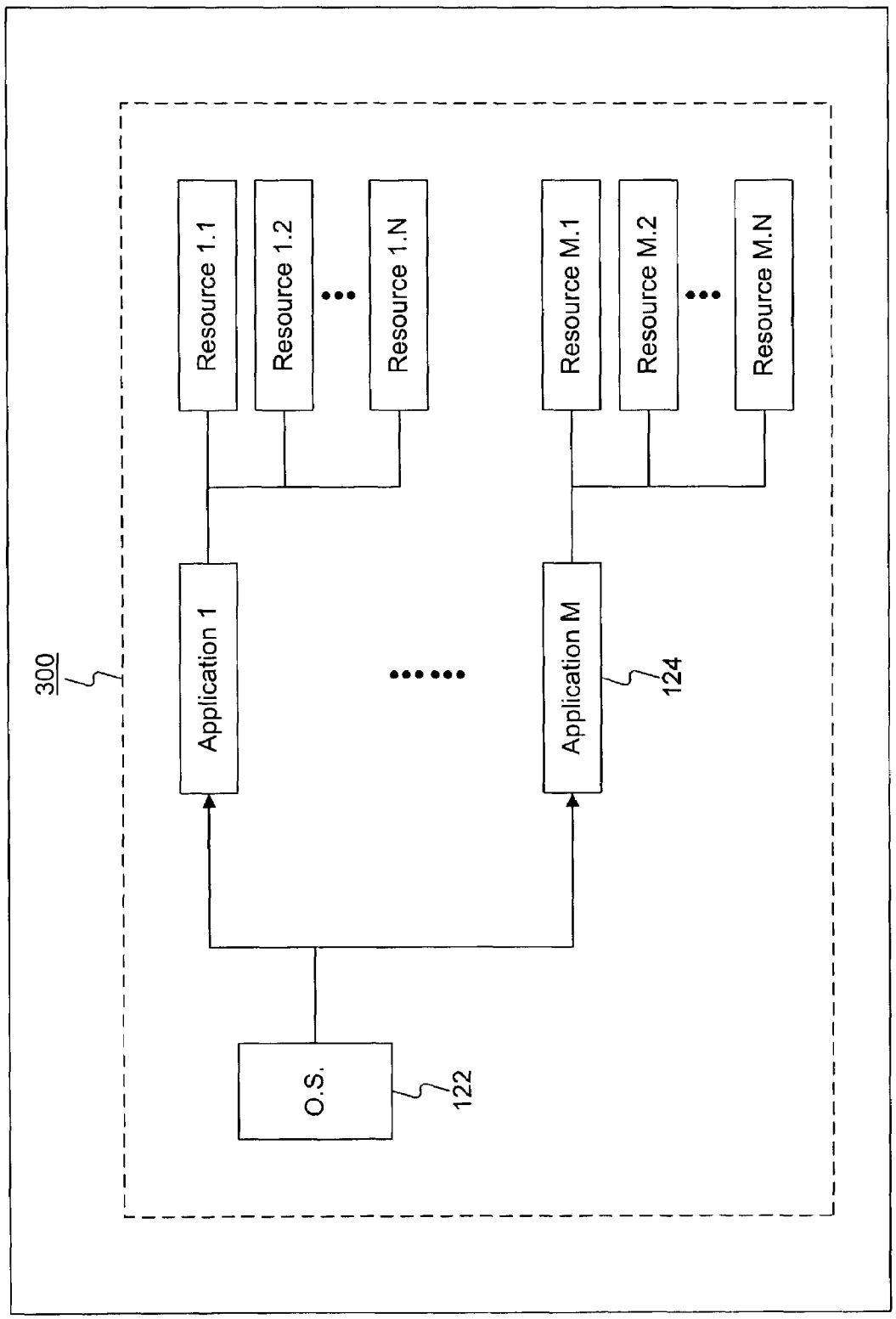
FIG. 3 illustrates conventional resource management of a multi-mode wireless digital communication system.
Figure 4:
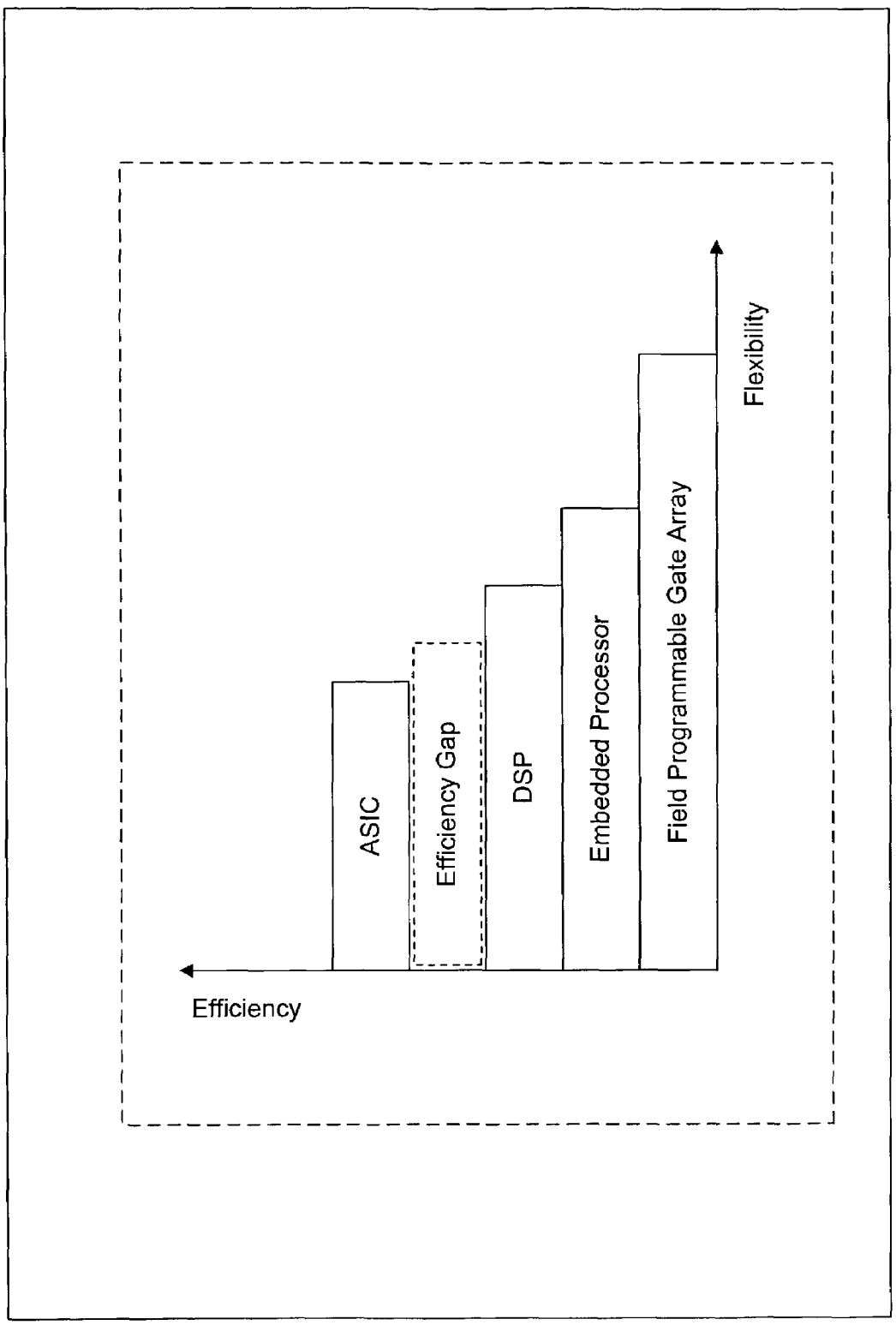
FIG. 4 is a graphical illustration of flexibility and efficiency among different hardware.
Figure 5:
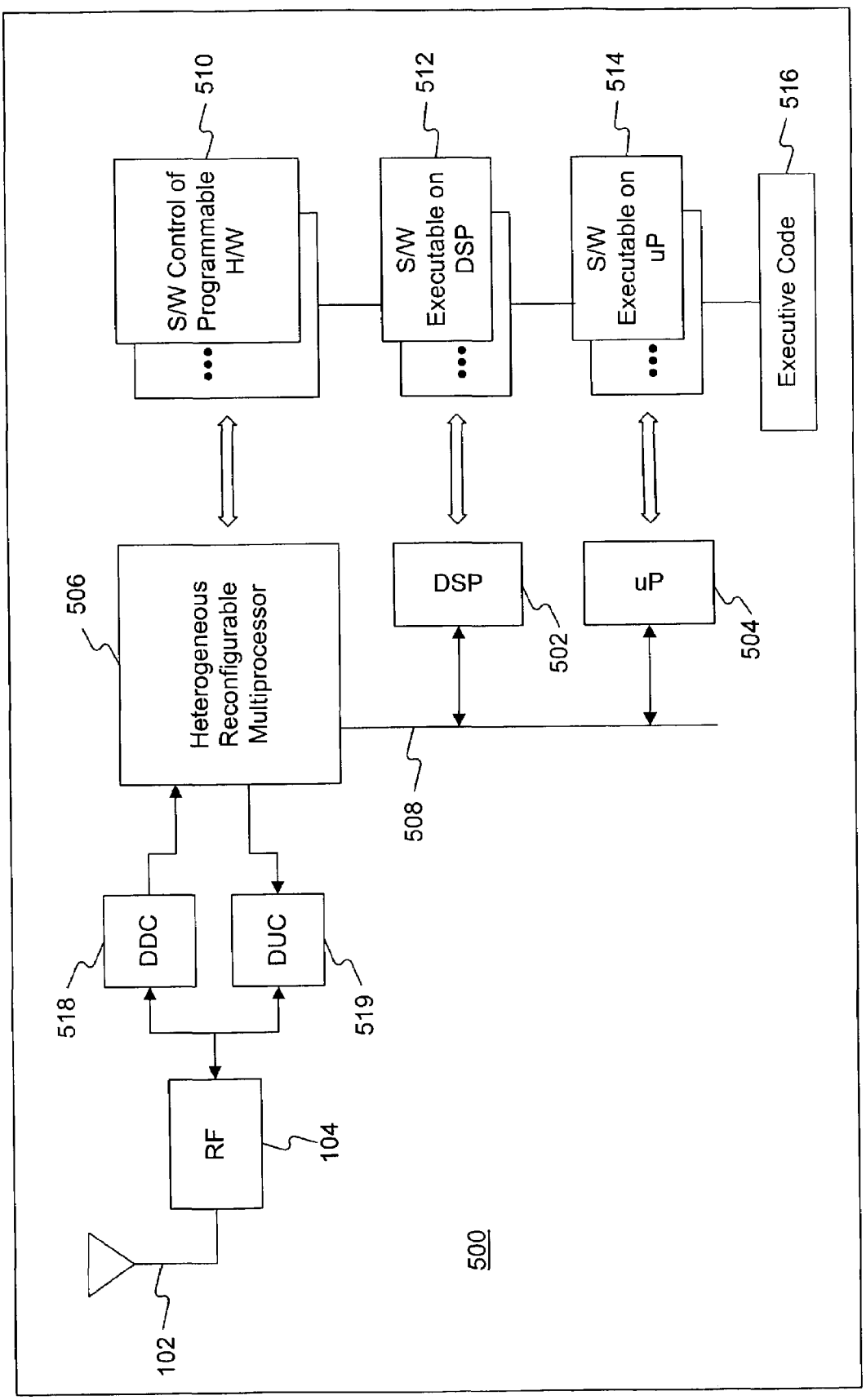
FIG. 5 illustrates conventional hardware architecture and resource management in a re-configurable wireless digital communication system consistent with the principles of the present invention.
Figure 6:
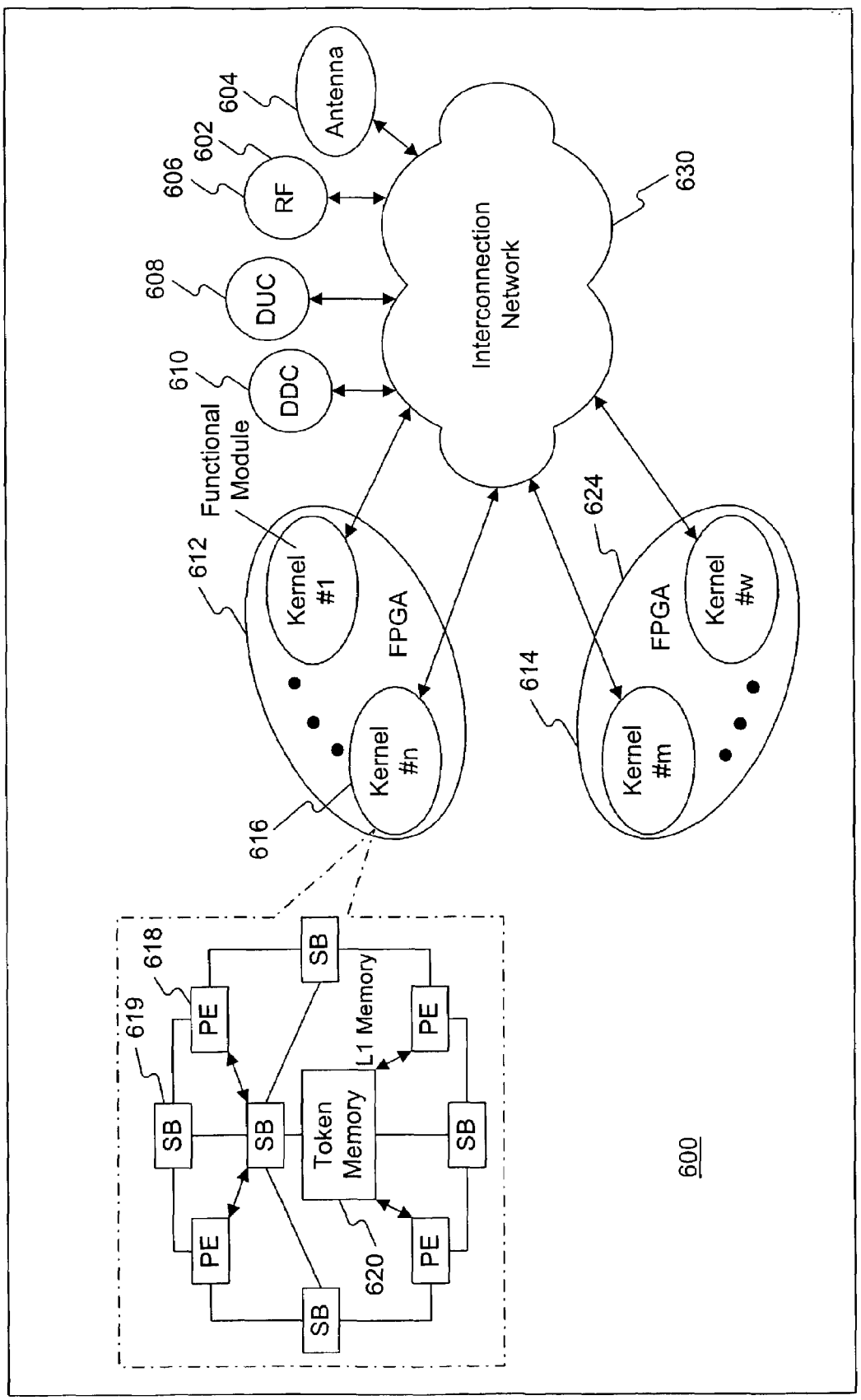
FIG. 6 illustrates a block diagram representation of one layer of a kernel-oriented macro based software defined radio multi-layered architecture for a wireless digital communication system in accordance in an embodiment consistent with the principles of the present invention.

FIG. 6, illustrates one layer of a kernel-oriented macro-based SDR multi-layered architecture 600 consistent with the principles of the present invention. An RF front-end 602 includes an antenna 604, an RF module 606, a digital up-converter or A/D converter 608, and a digital-down converter or D/A converter 610. In practice, the components of RF front-end 602 can be varied according to different band and frequency requirements. Different combinations may influence performance. Different wireless digital communication standards, applications and services change the requirements of RF front-end 602 and its performance may vary accordingly. Architecture 600 can use pre-designed and pre-tested RF front-end kernels to implement the functions of RF front-end 602.

Base-band functions are implemented by combining re-configuration kernels and re-programmable kernels. An FPGA pool 612 and a DSP pool 614 each include hardware components which can be selected to support different applications and services. Sufficient hardware components are chosen from FPGA pool 612 and DSP pool 614 for each application. Thus each application or service is selected to support configurable hardware resources and programmable digital signal processors, where re-configuration kernels operate on FPGAs and re-programmable kernels operate on DSPs. The kernels included in the FPGA pool 612 and the DSP pool 614 of FIG. 6 are subtasks of the application performed in these devices. Each application may be broken down into a series of subtasks that are performed to create the application.

A re-configurable kernel 616 of FPGA pool 612 is illustrated in greater detail and includes processing elements (PE) 618, a layer 1 (L1) memory 620 and switching matrixes 622. Each PE 618 is a fundamental logic element used to construct a desired hardware function. In architecture 600, each PE 618 is defined as a macro provided by an FPGA vendor. Such macros as may be available from FPGA vendors may include functions such as accumulator, multiplier, correlator, or FIR filter, according to different FPGA architectures. Macros are reusable and can be modified for different usage, changing parameters and reloading. Re-configurable kernel 616 serves to configure different hardware for dedicated functions to substitute for an ASIC for different wireless digital communication standards, applications and services.

L1 memory 620 can be provided as a fast multi-port memory for passing and steering tokens between PEs 618, and used with switching matrixes 622 to regulate data busing and signaling between PEs 618. Re-configurable kernel 616 can be configured for some functions by interconnecting PEs 618 and using glue logic (i.e., connecting devices with dissimilar bus architecture) to implement the required hardware functions. A re-programmable kernel 624 is a software task executed on a DSP that can be used to implement low bandwidth functions of digital signal processing such as automatic frequency control, channel estimation, and CODEC. By implementing a new set of RF front-end kernels, and re-configuring the re-configurable kernels and re-programming the re-programmable kernels, a new base-band function can be achieved, and hence a new wireless digital communication standard, application or service can be implemented.

An interconnection network 630 responds to the tasks of information exchange, configuration and signaling. It is implemented by combining a layer-memory structure, a layer-routing structure, and a layer-bus structure. The layer-memory structure passes and steers tokens between kernels, the layer-routing structure interconnects data and control ports between kernels and the layer-bus structure handles signaling between kernels. For the purpose of extending capability, a global router and a global bus are used to operate the interconnection and signaling between undefined layers. A hardware manager 632 monitors and controls utilization of local routing resources to achieve incremental optimization of routing. The interconnection network enables one layer of kernel oriented macro-based SDR multi-layered architecture 600 to communicate with other layers of the multi-layered kernel oriented macro-based architecture.

Figure 7:
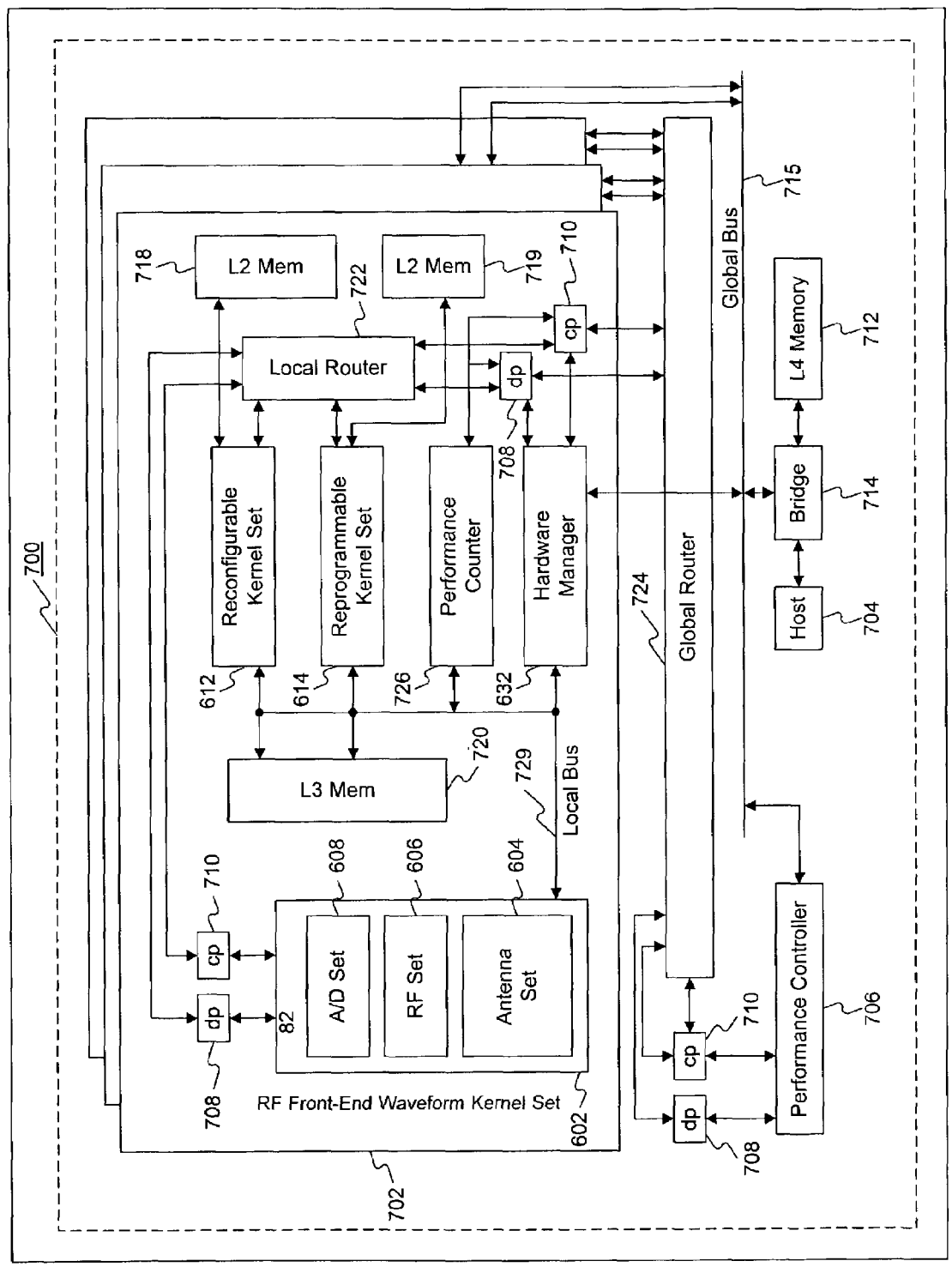
FIG. 7 illustrates architecture of a kernel-oriented macro based software defined radio multi-layered architecture for a wireless digital communication system in accordance with an embodiment consistent with the principles of the present invention.

FIG. 7 illustrates in block diagram form a hardware configuration 700 for implementing multiple layers of kernel oriented macro-based SDR multi-layered architecture 600. Hardware configuration 700 adapts FPGAs and DSPs as configurable and programmable components to achieve flexibility, and uses the optimized macros provided by FPGA vendors to gain efficiency. Multiple layers 702 are composed to form a required platform, and layers are added or deleted according to the complexity of the standard being implemented, to form an entire wireless digital communication system. The extendibility of the multi-layered architecture in hardware configuration 700 enables hardware configuration 700 to implement one or more present digital wireless communication standards simultaneously and to accommodate future digital wireless communication standards.

A host 704 functions to manage resources between layers. Above all of the layers, a performance controller 706 is provided to monitor the status of global router 724 via a data port 708 and a control port 710. A layer 4 L4 memory 712 stores configuration data and parameters. Host 704 uses a bridge 714 and a global bus 715 to control the components of layers 702. A bridge 714 is used to support an access port to monitor and control the components of layers. The memory resources, router resources and bus resources are managed in a hierarchical sense.

There are four levels of hierarchy of memory in the memory resources, that form a layer-memory structure, including a layer 1 (L1) memory 716, layer 2 (L2) memories 718 and 719, a layer 3 (L3) memory 720, and layer 4 (L4) memory 712. L1 memory 716 serves as a cache-like storage that renders fast data exchange between PEs. L2 memory 718 associated with re-configurable kernel 612 supports a data structure for token passing and steering between re-configurable kernels. L2 memory 719 associated with re-programmable kernel 614 supports executable codes of the digital signal processing tasks of each re-programmable kernel, as well as a data structure for information sharing between re-programmable kernels. L3 memory 720 serves as the main memory of the layer and is used to store configuration data and executable tasks executed on a hardware manager. L4 memory 712 stores the configuration data and the executable codes executed on host 704.

The router resources of configuration 700 have a layer-router structure that includes a local router 722 and global router 724. Local router 722 interconnects I/O pins among kernels. The I/O of each kernel is gathered and partitioned into two ports, either data port 708 or control port 710. Data port 708 can be designed to be a variable-length structure through the control of control port 710, only modifying the length parameters of data port 708 and control port 710 so that different lengths of kernel I/O can be interconnected smoothly. Global router 724 interconnects I/O pins among layers. The I/O of each layer can be gathered and partitioned into two ports, variable-length data port 708 and variable-length control port 710. The hardware manager monitors and controls utilization of local routing resources to achieve incremental optimization of routing.

Re-configurable kernel 612 (FIG. 6) is a high-bandwidth-intensive function implemented by different configurable devices, especially FPGAs provided by different complex programmable logic device (CPLD) vendors like Altera Corp. of San Jose, Calif. or Xilinx, Inc. of San Jose, Calif. Re-configurable kernel 612 is a functional hardware module that implements digital logic with timing-critical or high bandwidth requirements. Because CPLD vendors often supply macros that are optimized in area-sense and timing-sense due to the understanding of their configurable device architecture, macros are viewed as basic hardware elements and combined to build parameterized specific hardware functions such as a digital pulse shaping function, spreading/de-spreading function or digital modem. A suitable re-configurable kernel is selected and combined by macros from the re-configurable kernel library to build required hardware and utilize the FPGA.

Re-programmable kernel 614 is a low-bandwidth-intensive function implemented by different digital signal processors provided by different DSP vendors, such as Texas Instruments, Inc. of Dallas, Tex., Applied Dynamics International, Inc. of Ann Arbor, Mich. and Motorola, Inc. of Arlington Heights, Ill. Re-programmable kernel 614 is a functional software task that implements a low bandwidth digital signal processing function that is suitable for a digital signal processor. Hardware manager 632 provides a pool of application program interface (API) drivers running on a microprocessor that perform data flow scheduling, resource management, and hardware configuration. Meanwhile, performance counter 726 monitors the current status of the radio link and cooperates with hardware manager 632 to implement the performance feedback-decision resource management mechanism in order to optimize the performance of the system. A local bus 728 is used to connect components within the layer in which it is located, i.e., the local layer. Local bus 728 transports data between the components in the local layer.

Hardware configuration 700 embodies the multiple layers 702 that include a layer memory structure comprising L1 memory 620, L2 memory 718 or 719, and L3 memory 720, a layer router structure comprising local router 722 and a layer bus structure comprising local bus 729. The layer memory structure, layer router structure and layer bus structure also include L4 memory 712, a global router 724 and a global bus 715, respectively. By the use of the hardware configuration 700, different kernels from four categories of kernel libraries can route to each other and exchange information by a token structure implemented in the layer-memory structure. RF front-end waveform kernels are combined to realize RF front-end subsystem 602 having an output gathered on data port 708 and control port 710. Signals from data port 708 and control port 710 are routed to re-configurable kernels and re-programmable kernels via local routers 722, or global router 724.

Data port 708 and control port 710 also handle control and signaling between the layer-router structure and the layer-bus structure. This architecture exploits the combination of configurable hardware kernels and programmable software kernels and through multi-layered architecture enables implementation of one or more present digital wireless communication standards simultaneously and the ability to accommodate future digital wireless communication standards. The kernel performs the computation-intensive signal processing functions that can be performed by either FPGA or DSP code, including cooperation between the FPGA and the DSP. Depending on which standard or service is to be implemented, adequate kernels are chosen from different kernel libraries to fit the standard or service specification of interest. The configuration data for re-configurable kernels and the executable codes executed on re-programmable kernels are loaded and stored into L3 memory 720. After configuring individual re-configurable kernels and individual re-programmable kernels, the separate heterogeneous functions are integrated by interconnection and token steering via the hardware configuration 700.

Interconnection and data sharing medium system 630 (FIG. 6), including the layer-memory structure, the layer-router structure, and the layer-bus structure, is used to link RF front-end waveform kernels, re-configurable kernels, re-programmable kernels and hardware managers. Kernels are chosen from different kernel libraries, and each kernel is controlled by the corresponding software tasks. By choosing adequate kernels from kernel libraries, the functions of hardware framework can easily switch from one wireless digital communication system to another.

Figure 8:
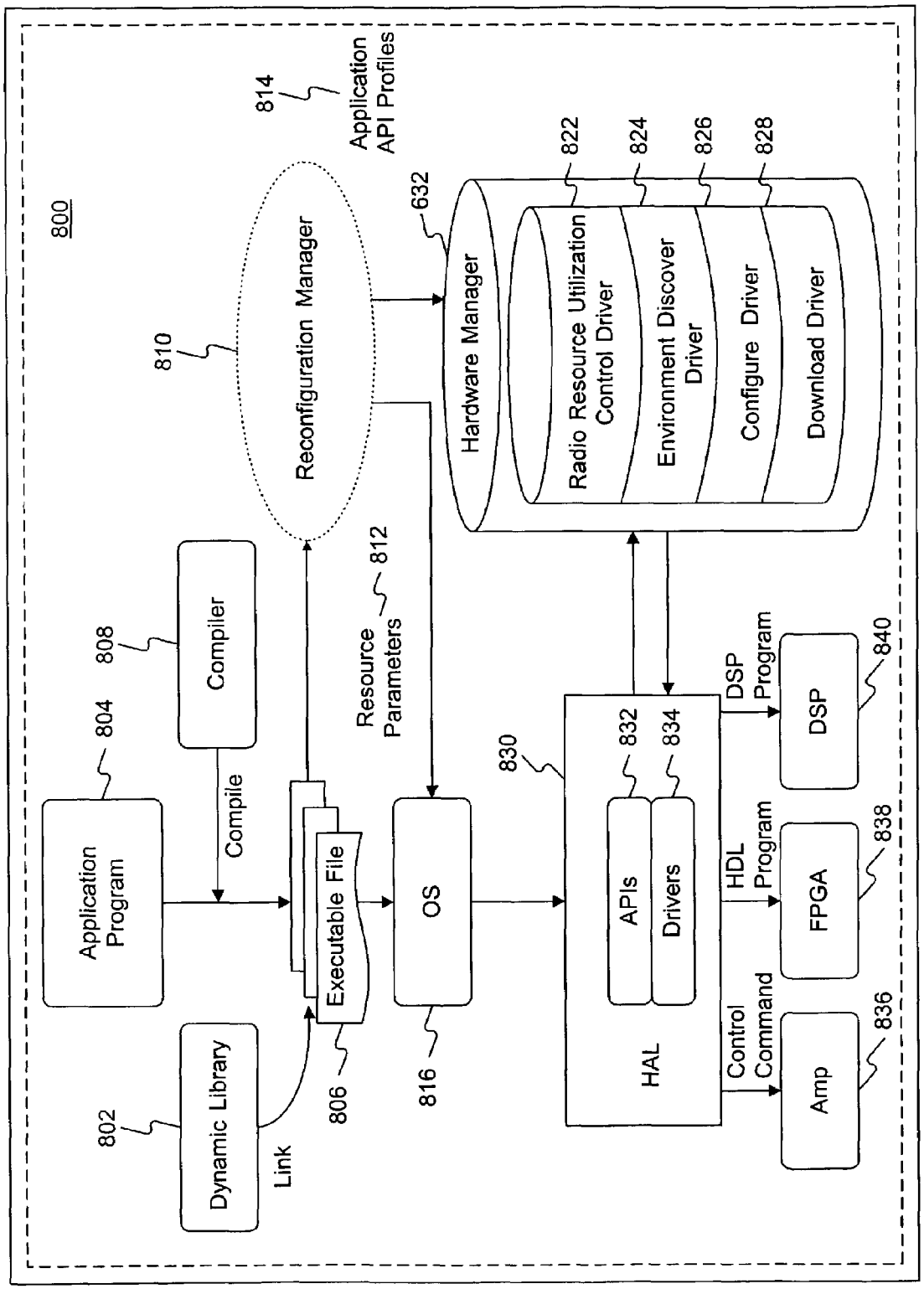
FIG. 8 illustrates an execution procedure practiced in a hardware configuration for an application program in accordance with an embodiment consistent with the principles of the present invention.

FIG. 8 illustrates an execution procedure 800 practiced in a hardware configuration for an application program. A dynamic library 802 includes radio function signal processing modules, real-time control modules and hardware interface modules. Library 802 has linking information to the real functions at run time. This technology is similar to a dynamic linking library which has been used in operating systems. An application program 804, such as a wideband code-division multiple access (WCDMA) or wireless local area network (WLAN), can be compiled into an executable file 806 by a compiler 808. The loading of dynamic library 802 entails a reconfiguration manager 810 downloading a new library from a network or loading the library from a storage device to hardware devices. Required resource parameters 812 generated by executable file 806 are sent to reconfiguration manager 810 to generate an application API profile 814 for that specific application. Meanwhile, executable file 806 at run time, including linking information to hardware-related programs such as DSP codes and HDL codes, of a specific air-interface application, is generated from the compiled application program and the radio functions linked from library 802.

API profile 814 can then be transferred to either an OS 816 or a hardware manager 632 that corresponds to hardware manager 632 shown in FIGS. 6 and 7. Hardware manager 632 interprets and maps between a software framework and a hardware framework according to the current status of the radio environment and resource utilization. Hardware manager 632 maintains a radio resource utilization driver 822, an environment discover driver 824, a hardware configure driver 826, and a download driver 828. Radio resource utilization driver 822 is used to record and maintain utilization tables among hardware resources. Environment discover driver 824 is used to monitor and record a current radio environment. According to the status of hardware resource utilization information provided by radio resource utilization driver 822, by a maintained hardware abstraction layer (HAL) 830 mapping, a one-to-one path from a HAL API 832 to a HAL driver 834 is pre-defined. A HAL is a layer of programming that allows an operating system to interact with a hardware device at a general or abstract layer rather than a detailed hardware level. Hardware configure driver 826 performs mapping between API profile 814 and available supporting drivers 834, and hardware download driver 828 downloads executable file 806 into selected supporting drivers 834. After the above procedures are performed by configure driver 826 and download driver 828, different classes of HAL drivers like ADC driver, DAC driver, and modem driver, are downloaded into specified hardware devices such as an amplifier 836, an FPGA 838, and a DSP 840 of each layer of the multi-layered architecture such that it is possible to implement one or more present digital wireless communication standards simultaneously and the ability to accommodate future digital wireless communication standards.

Mapping between functions and kernels varies when different wireless digital communication applications are required. Criteria needed for the standard-driven architecture disclosed herein is dependent on parameters, including throughput, latency, I/O pin count, area, memory requirements, performance requirements and power consumption. According to radio environment and maintained resource utilization tables, hardware manager 632 can coordinate available resources to fit optimally into the requested services with recorded status. Thus, the same hardware platform can be reused via execution procedure 800 of re-configuring and re-programming specified hardware resources. After selecting suitable kernels according to the current radio environment and resource utilization tables, a corresponding data structure for token exchange is determined for a new data flow and control flow.

Figure 9:
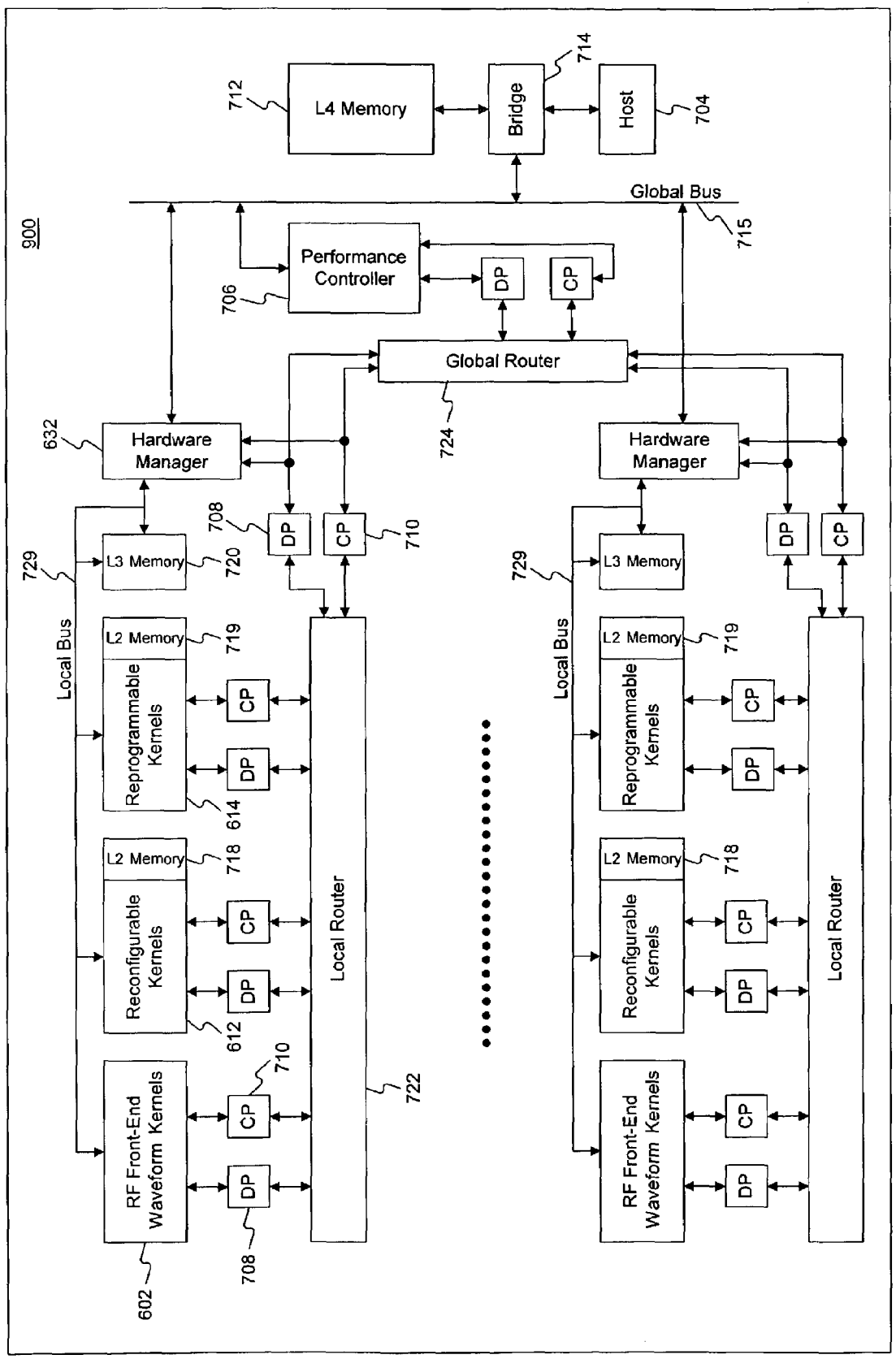
FIG. 9 illustrates a hierarchical structure of a re-configurable and re-programmable hardware framework of a wireless digital communication system in accordance with an embodiment consistent with the principles of the present invention.

FIG. 9 illustrates a hierarchical structure 900 of the kernel-oriented macro-based SDR multi-layered architecture. In FIG. 9, the kernel may be RF front-end waveform kernel 602, re-configurable kernel 612, or re-programmable kernel 614. The network of data flow between kernels is mainly formed by local router 722 and L2 memory 718 or 719 via data port 708 and control port 710, and the network of signaling flow between kernels is mainly formed by local bus 728 via data port 708 and control port 710. That is, each layer has a layer-resource scheme to be re-configured and re-programmed to satisfy a new requirement according to a new wireless digital communication standard or service. The layer-resource scheme of each layer mainly includes the layer-memory structure, including L1 memory 620, L2 memory 718 or 719, and L3 memory 720, local router 722 of the layer-router structure and local bus 729 of the layer-bus structure. With reference also to FIG. 6, L1 memory 620 resides in re-configurable kernel 612 and is used to build up a fast communication channel between processing elements (PE) 618. The group aggregated by re-configurable kernels should need one L2 memory 718 to form the communication channel between re-configurable kernels 612. Also, the group aggregated by re-programmable kernels should need one L2 memory 719 to form the communication channel between re-programmable kernels 614. L3 memory 720 serves as the main memory of the layer and stores the configuration data and the executable codes for hardware manager 632 to execute software tasks to implement resource management.

Figure 10:
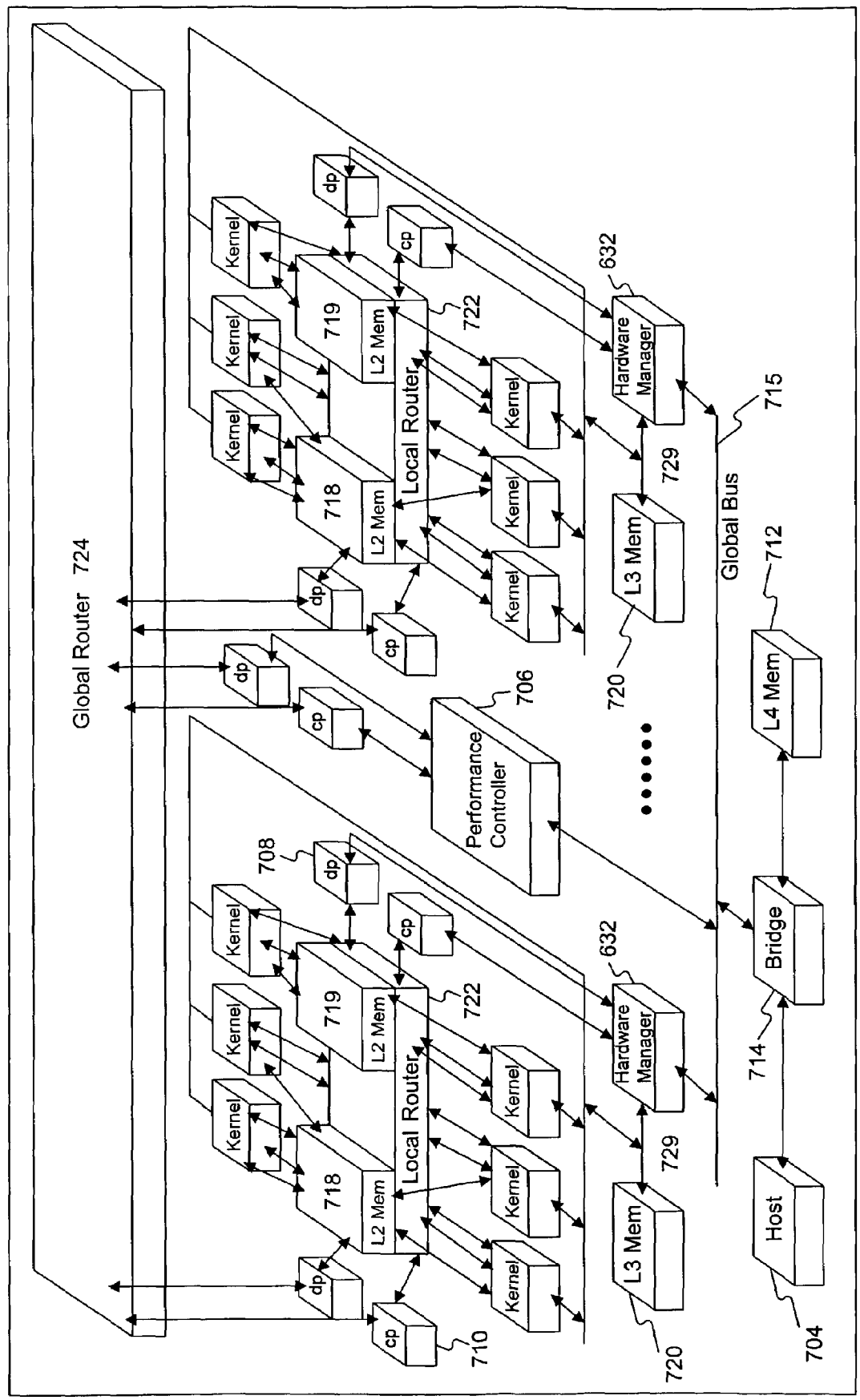
FIG. 10 illustrates a hierarchical scheme of a kernel-oriented macro based software defined radio multi-layered architecture for a wireless digital communication system in accordance with an embodiment consistent with the principles of the present invention.

FIG. 10 is a three-dimensional diagram showing the hierarchical layer structure of resource management of the kernel-oriented macro-based SDR multi-layered architecture. The architecture classifies resources into three categories, including computational units, data flow, and control flow. The computational units comprise RF front-end waveform kernels 602, re-configurable kernels 612, and re-programmable kernels 614. They are used to implement the operations of wireless digital communication functions including waveform processing and digital signal processing.

The data flow is defined by the path and storage needed to form data-exchange network between computational units, and mainly comprises layer-memory structure and layer-router structure. The control flow is defined by the path and storage needed to form the signaling-exchange network between computational units, and mainly comprises layer-memory structure and layer-bus structure. Each kernel shown in FIG. 10 may be RF front-end waveform kernel 602, re-configurable kernel 612, or re-programmable kernel 614. Kernels are aggregated to build functional blocks in order to implement one or more present digital wireless communication standards simultaneously and the ability to accommodate future digital wireless communication standards.

When a new standard, application, or service is encountered, the corresponding parameters and resources should be chosen and organized to fit the request. The parameters comprise throughput, latency, I/O pin count, area, memory requirements, performance requirements, power consumption, and resources including hardware resources and software resources. The hardware resources supported by this architecture are RF front-end waveform kernel 602, re-configurable kernel 612, re-programmable kernel 614, layer-memory structure, layer-router structure and layer-bus structure that supply the hardware requirements to form an event-driven hardware platform. However, the executable software resources of hardware manager 632 are used to handle observable and controllable functions of wireless digital communication. Re-configurable kernels 612 and re-programmable kernels 614 are designed with a parameter-based structure that is optimized for some specific algorithms, including configuration data loaded into the FPGA and the DSP. In order to separate data flow and control flow to increase operation speed between kernels, an out-of-band technique is provided. Data usually varies rapidly but control signaling often changes only for a short period. This architecture uses the out-of-band technique to harmonize different rates between data flow and control flow with cooperating layered-router structure, layer-bus structure, variable length data port 708 and variable length control port 710.

Figure 11:
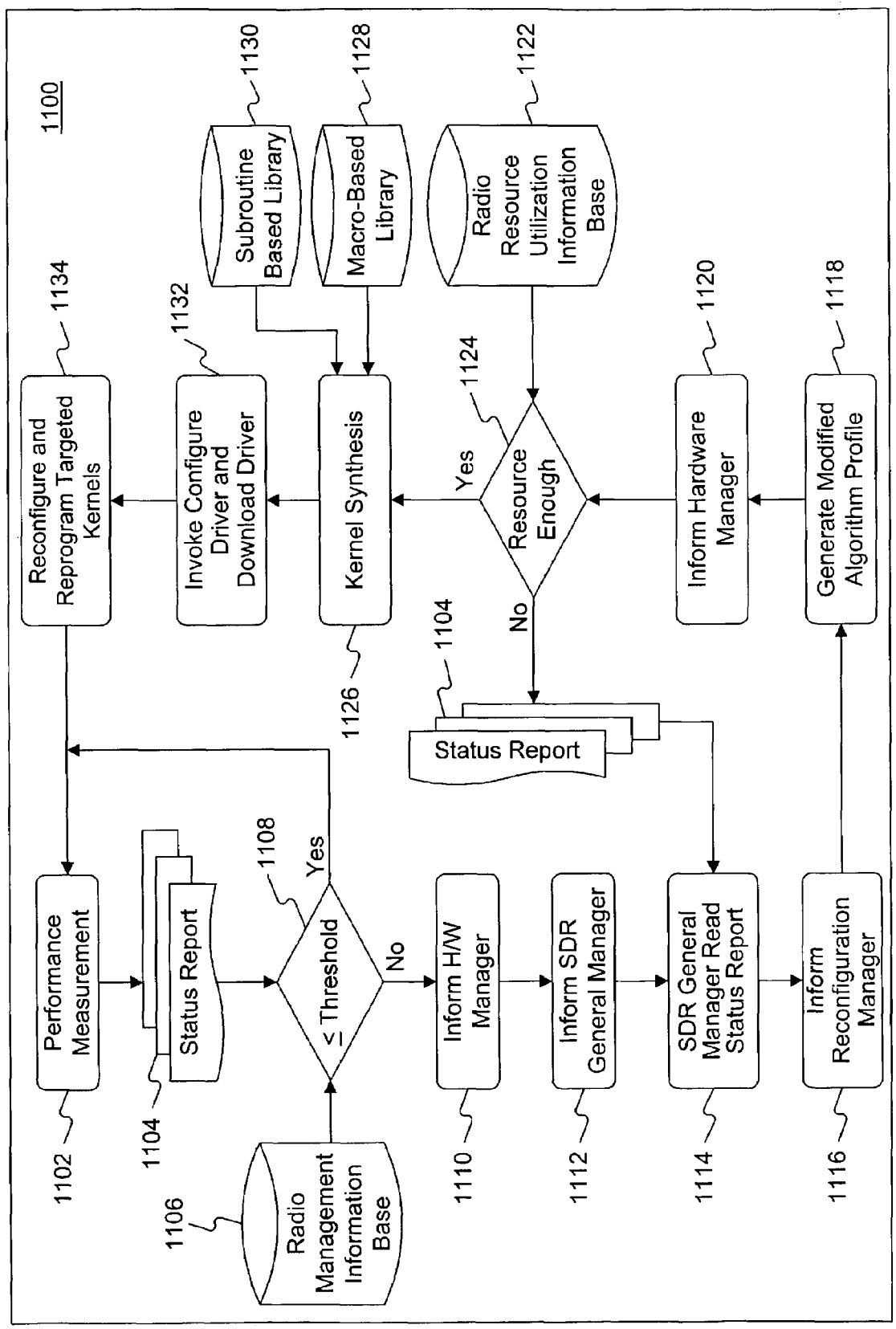
FIG. 11 is a flow chart illustrating an execution procedure of dynamic hardware configuration in accordance with an embodiment consistent with the principles of the present invention.

Moreover, the performance feedback-decision resource management mechanism monitors and analyzes some key parameters via performance counter 726 to determine whether the utilization of resources should be changed to approach the goal of incremental optimization. An execution procedure of dynamic hardware configuration 1100 is shown in FIG. 11. Performance is monitored via performance counter 726 on a stage of performance measurement (1102), and results of the measuring are compiled in a status report (1104) to be stored on L3 memory 720. A radio management information base (RMIB) 1106 is a database of radio link related performance parameters like signal-to-noise ratio (SNR), and channel impulse response (CIR). The measured result record on status report (1104) is compared with corresponding parameters record stored in RMIB 1106. If the compared result is larger than a pre-defined threshold (1108), an interrupt is invoked to inform hardware manager 1110. Otherwise the status changing degree has not exceeded the threshold, and performance continues.

According to the triggered interrupt, hardware manager 632 informs the SDR general manager (1112), and SDR general manager (1112) obtains detailed status information from the status report (1114). By analyzing the detailed status information and choosing suitable algorithms to generate a new configuration scheme, SDR general manager (1112) instructs reconfiguration manager 810 to change the current configuration scheme (1116). In response, reconfiguration manager 810 generates a modified algorithm profile (1118). Reconfiguration manager 810 also informs hardware manager 632 that there is a new configuration scheme to be handled 1120. A radio resource utilization information base (RRUIB) 1122 is a database that records in tables the utilization of all hardware resources maintained by hardware manager 632. These hardware resources utilization tables are maintained by radio resource utilization control driver 822 of hardware manager 632. After a new algorithm profile is received, hardware manager 632 checks whether there are sufficient hardware resources to implement the new algorithm (1124) according to the maintained resources utilization record read from RRUIB 1122. If the available resources can not handle the new algorithm profile, hardware manager 632 will issue a status report to inform the SDR general manager that hardware resources are insufficient to support the desired algorithm to improve performance.

If the available resources maintained by hardware manager 632 are sufficient to implement the new algorithm profile, hardware manager 632 starts the operation of kernel synthesis (1126). Kernel synthesis is a real-time procedure in which optimized hardware macros and software tasks are chosen to implement the desired algorithm. There are two libraries to provide the required optimized hardware macros and software tasks. One is a macro-based library (1128) which supports different classes of optimized hardware macros provided by different configurable devices, available from CPLD vendors such as ALTERA, Xilinx, and Lucent. The other library is a subroutine based library (1130) which supports many different classes of optimized software subroutines provided by different programmable devices, available from DSP vendors like such as TI, Motorola, and ADI. After choosing suitable optimized macros from macro-based library (1128) and software tasks from subroutine based library (1130), the new algorithm can be synthesized. Configure driver 826 of hardware manager 632 now performs mapping to the supporting driver (1132). Moreover, download driver 828 of hardware manager 632 is invoked to reconfigure and reprogram the corresponding targeted configurable kernels and programmable kernels (1134).

This execution procedure of dynamic hardware configuration 1100 is a closed-loop procedure including performance measuring, new algorithm profile generation, radio resource utilization checking, kernel synthesis for new algorithm profile, and targeted kernels reconfiguring and reprogramming. Via the cooperation of radio resource utilization control driver 822, configure driver 826, and download driver 828, hardware resources can be utilized more efficiently. Further, the capability of the performance feedback-decision resource management mechanism can be achieved by implementing this closed-loop execution procedure of dynamic hardware configuration and finally download executable files to configurable devices with local reconfiguring ability. Using the performance feedback-decision resource management mechanism, the current status of the radio link can be sensed immediately and radio link performance related parameters like SNR and CIR are fed back via performance counter 726 to decide whether the utilization of resources should be changed dynamically to satisfy the variable characteristic of the radio link and thereby approach the goal of incremental optimization.

Figure 12:
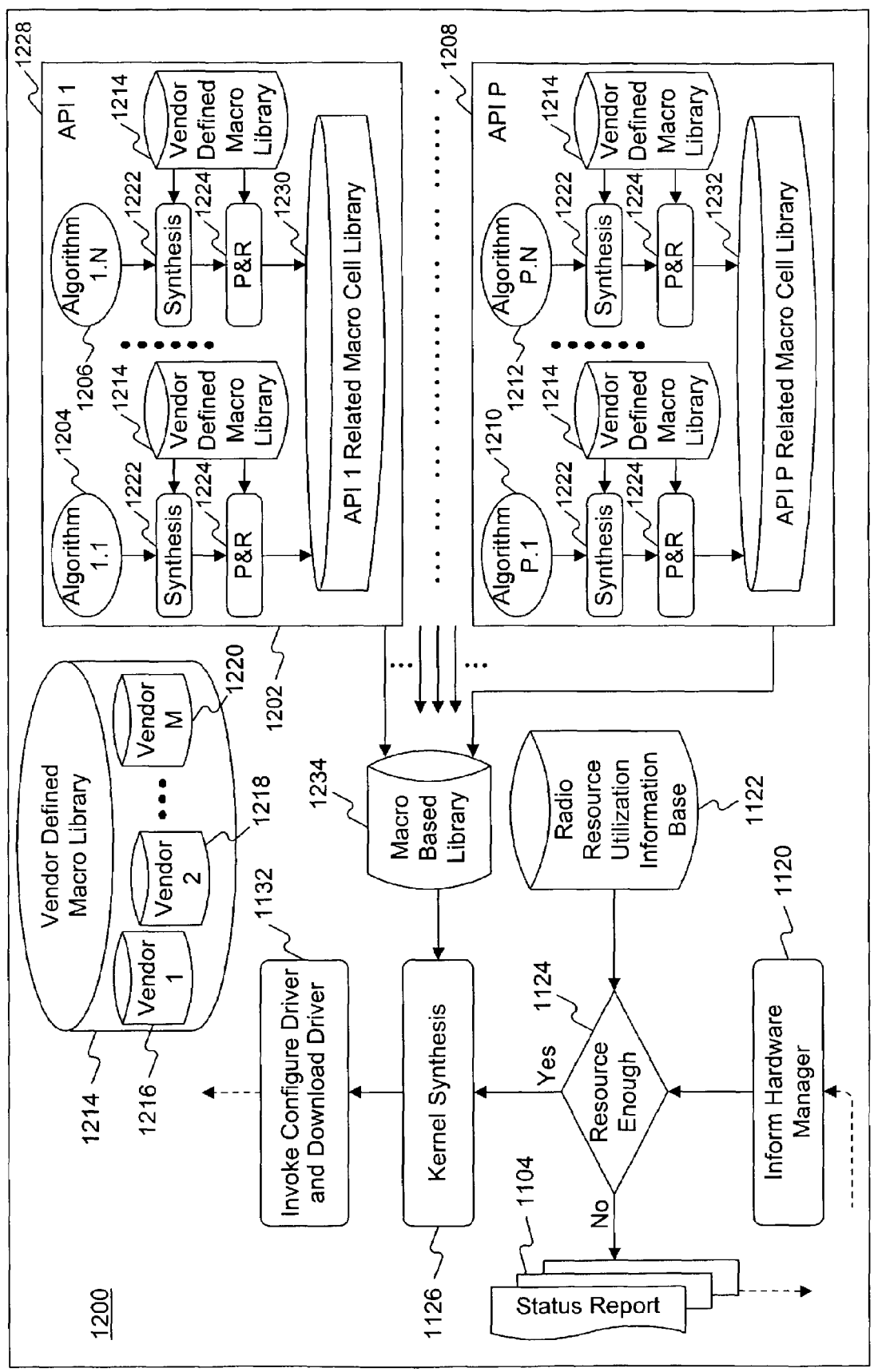
FIG. 12 illustrates a macro-based architecture for reconfiguration of configurable kernels in accordance with an embodiment consistent with the principles of the present invention.

The architecture is a macro-based architecture because it uses pre-designed optimal macros provided by different configurable device vendors as basic processing elements to implement desired functions. FIG. 12 illustrates an execution procedure 1200 of macro-based configurable design. For the purpose of illustration, standards or services are categorized into P functional blocks and P APIs which are defined as API 1, API 2, . . . API P, to describe the corresponding elementary functions. Different design constraints such as throughput, latency, complexity, and power consumption apply for choosing different algorithms to implement the same functional block, that is, one API can comprise many versions of implementations based on choosing different algorithms. For example, candidates to implement the same functional block of API 1 1202 are selected from among algorithm 1.1 1204 to algorithm 1.N 1206. On the other hand, candidates to implement the same functional block of API P 1208 are selected from among algorithm P.1 1210 to algorithm P.N 1212 of API P. The architecture uses a vendor defined macro library 1214 as a targeted library to synthesize design. There are M vendor libraries, named vendor 1 macro library 1216, vendor 2 macro library 1218, and vendor M macro library 1220, provided by different configurable device vendors such as ALTERA, Xilinx, and Lucent. Algorithm 1.1 1204 is synthesized 1222 and placed and routed P&R 1224 by using vendor defined macro libraries 1214.

Many versions of implementing algorithm 1.1 can be generated. For example, an ALTERA-version algorithm 1.1 is an implemented version of algorithm 1.1 via an ALTERA macro library. In the alternative, hardware manager 632 may have selected a Xilinx-versioned algorithm 1.1 or Lucent-versioned algorithm 1.1. Meanwhile, other algorithms belonging to API 1 also perform the same function as algorithm 1.1 but with different design constraints and apply to different radio environments. Algorithm 1.N 1206 can also be synthesized 1222 and subjected to 1224 to generate different vendor-version implementations to realize algorithm 1.N at a different status. The compiled results of different algorithms of API 1 1202 based on different vendor supported macro libraries are gathered to form an API 1 related macro cell library 1230. On the other hand, API 2, API 3, . . . and API P have their corresponding macro cell libraries such as macro cell library 1232 of API P 1208. By gathering all API related macro cell libraries, from API 1 related macro cell libraries to API P related macro cell libraries, a macro-based library 1128 is generated to implement elementary functional blocks whose different combinations can implement chosen standards, services and applications.

Figure 13:
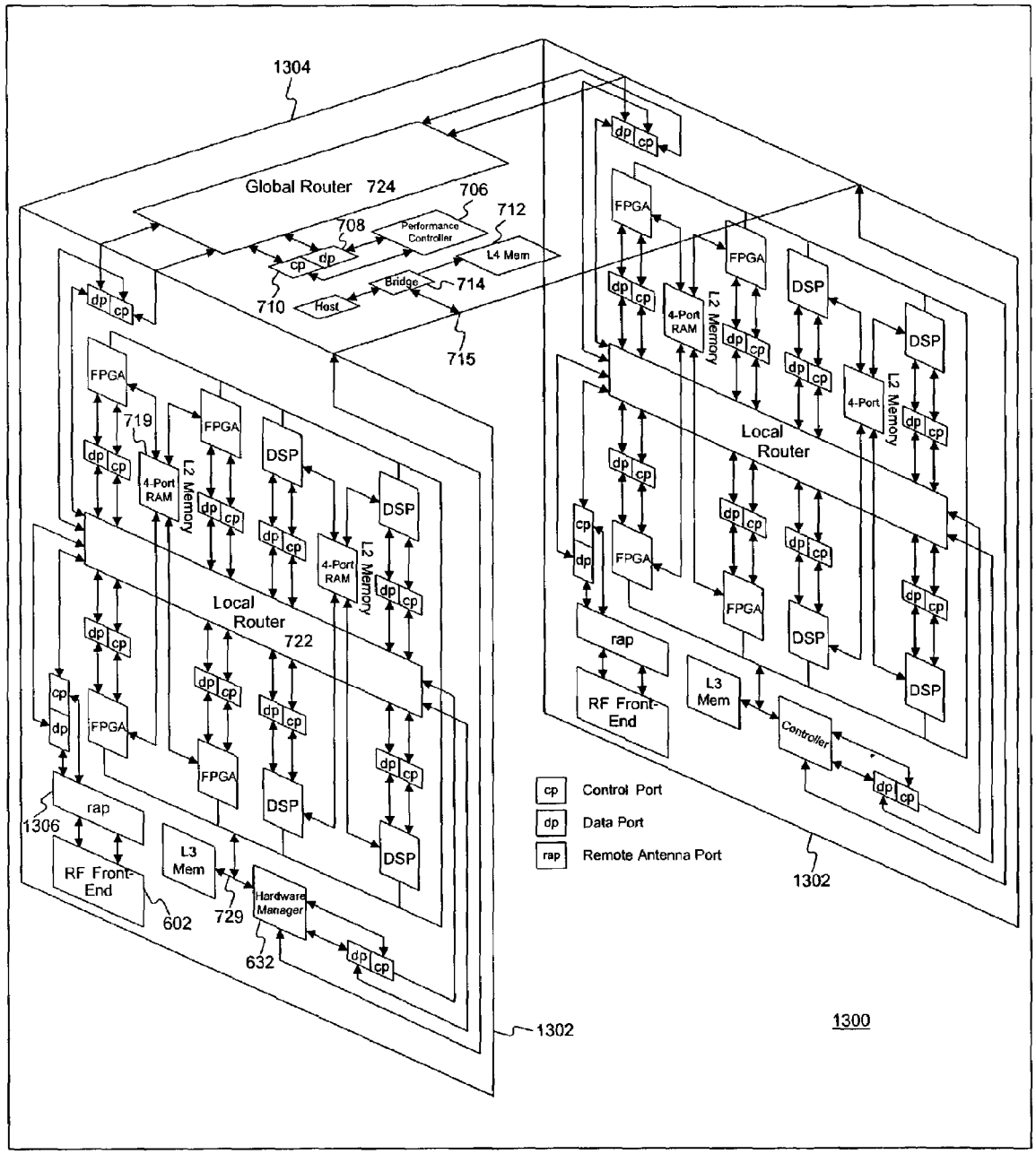
FIG. 13 illustrates a kernel-oriented macro-based software defined radio multi-layered architecture for a wireless digital communication system in accordance with an embodiment consistent with the principles of the present invention.

A kernel-oriented macro-based SDR multi-layered architecture 1300 is further illustrated in FIG. 13. Architecture 1300 is implemented in a chassis-like structure. Multiple layers 1302 are connected on a back-plane 1304, where the back-plane comprises global bus 715 and global router 724. Each layer 1302 is a basic component that operates on the chassis, and can support wireless plug-and-play functionality. One way to achieve wireless plug-and-play is to support an event-triggered scheme, and another way is based on hard-insertion and resource detection. Since the event-triggered scheme is supported in the architecture, when a new event of a standard, application or service occurs, environment discover driver 824 of hardware manager 632 is triggered and the corresponding parameters and resources switched to support the required performance.

The procedure to confirm sufficient resources, including an execution procedure of static hardware configuration 800 and a flexible macro-based architecture 1200, is part of an event-triggered scheme provided by the architecture. Another part is to support a performance feedback-decision resource management mechanism, which is an execution procedure of dynamic hardware configuration 1100, in order to fine-tune system performance to achieve incremental optimization. The ability of hard-insertion and resource detection is useful for extending capability, especially when a telecommunication service vendor wants to increase the capability of services to support additional users. The event of requesting a new wireless digital communication standards, applications or services can be transported by wired or wireless access, a service request from non-volatile storage on layer, or even switching manually. The event detection by event-triggered scheme will cause hardware manager 632 to find available hardware resources on the chassis and prepare for reloading new executable tasks to re-configure, re-program, and build a new platform to support a requested performance. If the available hardware resources are not sufficient to implement the new wireless digital communication standard, application or service, the lack of hardware and the number of layers required are documented so the new hardware resources can be obtained and added. The performance counter 726 is used to monitor and measure the radio link performance and report radio environment status, in order to re-arrange the resources after estimating the operating performance. Moreover, once new functions or algorithms are chosen, hardware manager 632 invokes configure driver 826 and download driver 828 to reconfigure and reprogram the targeted hardware resources.

The cooperation between event-driven configuration ability and hierarchical interconnection improves the requirements of different rates and increases the throughput of the system. After the feed-forward proceeds by configuring and programming the targeted kernels, the architecture is used to provide a performance feedback-decision resource management mechanism to integrate and dynamically maintain total computing power of the system in order to improve the utilization of resources. In addition to the capability to arrange and combine the same resources such as kernels and the interconnection network to build up new wireless digital communication standards, applications and services, the architecture also provides the ability to implement multiple standards within the same chassis simultaneously. That is, two or more standards can co-exist and operate simultaneously. By the use of remote antenna port 46, the new architecture can be used as a central-controlled base-station set center to replace the functions of base-band signal processing of the base-station. That is, the original location of base station is for transferring waveforms from antenna and RF modules. The other tasks of signal processing are moved to a central-controlled base-station set center to manage the hardware and software resources. By providing an RF front-end function via RF front-end waveform kernel at the original location where the base-station is located, complicated signal processing functions are moved to a central-controlled base-station set center and run on different layers for different purposes of multiple standards, applications and services. Instead of the original base-station which did not process base-band functions any more, a remote antenna only is used to handle analog waveform processing. As a result, the weight, size and complexity of the original base-station will shrink. Digitized signals from different locations of remote antennas will be received via a variable length remote antenna port and be gathered into a central-controlled base-station set center.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of programming and configuring components of an upgradeable and extendable wireless communication system in order to implement multiple wireless communication standards, services, and applications, comprising:
   (a) identifying one of the application, standard or service to be implemented;
   (b) compiling software stored in a software library that is associated with the identified application, standard or service and storing the compiled software in a host memory;
   (c) determining the utilization of hardware resources based on the compiled software; and
   (d) configuring hardware resources to meet the application, standard or service required.

2. The method of claim 1 wherein the hardware resources are located at different layers of the upgradeable and extendable communication system and are chosen to form an event-driven hardware platform.

* * * * *